United States Patent [19]

Iler et al.

[11] 4,105,426

[45] Aug. 8, 1978

[54] PROCESS FOR MANUFACTURE OF MACROPOROUS MICROSPHEROIDS

[75] Inventors: Ralph Kingsley Iler; Joseph Jack Kirkland, both of Wilmington, Del.

[73] Assignee: E. I. Du Pont de Nemours and Company, Wilmington, Del.

[21] Appl. No.: 826,900

[22] Filed: Aug. 22, 1977

Related U.S. Application Data

[62] Division of Ser. No. 693,111, Jun. 15, 1976, Pat. No. 4,070,286.

[51] Int. Cl.² ............................................. C03C 17/00
[52] U.S. Cl. ........................................... 65/18; 65/21; 55/67; 55/386; 210/31 C; 210/198 C; 252/317; 252/454; 264/60; 264/122
[58] Field of Search .................. 55/67, 74, 75, 386, 55/387, 389; 210/31 C, 198 C; 252/313 S, 317, 449, 454, 477 R; 65/18, 21; 264/60, 122

[56] References Cited

U.S. PATENT DOCUMENTS

| 3,274,888 | 9/1966 | Vanstrum et al. ................... 65/21 X |
| 3,328,230 | 6/1967 | Levecque et al. ................ 65/4 R X |
| 3,420,644 | 1/1969 | Lirones .................................... 65/18 |
| 3,505,785 | 4/1970 | Kirkland ................................. 55/67 |
| 3,635,824 | 5/1972 | Hedgesson et al. ............. 427/215 X |
| 3,758,284 | 9/1973 | Haller .................................. 65/18 X |
| 3,782,075 | 1/1974 | Kirkland ............................... 55/386 |
| 3,855,172 | 12/1974 | Iler et al. ............................ 260/39 R |
| 3,875,282 | 4/1975 | Steinreich .......................... 65/21 X |
| 3,920,578 | 11/1975 | Yates ................................ 252/313 S |
| 3,988,405 | 10/1976 | Smith et al. ........................ 65/18 X |

*Primary Examiner*—Robert L. Lindsay, Jr.

[57] ABSTRACT

Disclosed herein is a powder of discrete, macroporous, microspheroids, each having an average diameter in the range of 2 to 50 microns and each composed of a plurality of large colloidal particles joined and cemented together at their points of contact by 1 to 10% by weight of nonporous, amorphous silica. These microspheroids have a high degree of mechanical stability and a surface area between about 80 and 110% of that of the large colloidal particles. Also disclosed is a process for the manufacture of this powder.

4 Claims, 6 Drawing Figures

5 μm

5 μm

PROCESS FOR MANUFACTURE OF MACROPOROUS MICROSPHEROIDS

This is a division of application Ser. No. 693,111 filed June 15, 1976, now U.S. Pat. No. 4,070,286 granted Jan. 24, 1978.

BACKGROUND OF THE INVENTION

1. Field of the Invention

This invention relates to microspheroids composed of a plurality of colloidal particles and to a process for their manufacture. Such microspheroids are useful as column packings for chromatography, particularly liquid chromatography, as catalysts or catalyst bases, and as pigments.

2. Discussion of the Prior Art

U.S. Pat. No. 3,505,785 discloses superficially porous microspheroids, having an average diameter in the range of 5 to 500 microns, which are composed of an impervious core coated with a multiplicity of monolayers of colloidal inorganic particles having an average size in the range 0.005 to 1.0 micron. These superficially porous particles have a limited number of pores which are not distributed uniformly throughout the microspheroid.

U.S. Pat. No. 3,855,172 discloses microspheroids which are porous throughout and have an average diameter in the range of 0.5 to 20 microns. They are composed of colloidal inorganic refractory particles having an average diameter in the range of 0.005 to 1.0 micron. These microspheroids, which are characterized by their extremely uniform size, are formed by a coacervation process in which the colloidal particles are first encapsulated in an organic polymer matrix and then formed into porous microspheroids by burning off the organic material. For microspheroids in which the pores are uniformly distributed throughout the microspheroid, the average pore diameter is roughly equal to one-half the average diameter of the colloidal particles which make up the microspheroid. The pore diameter of such microspheroids can then be controlled by properly choosing the diameter of the colloidal particles used to form the microspheroid.

With the organic material present, microspheroids composed of large colloidal particles in the size range of 0.1 to 1.0 micron can be formed by the process disclosed in U.S. Pat. No. 3,855,172. When the organic material is burned off, however, these particles are extremely fragile and have limited use, unless the burning off takes place at a high enough temperature to sinter the colloidal particles together. When this occurs, the surface area of the microspheroid decreases markedly below that of the particles from which it is formed and the average pore diameter decreases, ultimately yielding a non-porous particle. There is, therefore, limited control over pore size and pore volume when larger collodidal particles are used to form the microspheroids.

U.S. Pat. No. 3,920,578, which issued on Nov. 18, 1975, to P. C. Yates et al., discloses an aqueous composition which can be used as one of the starting materials to form the powder of the present invention. As disclosed in Example 2 of that patent, a sol of large colloidal silica particles and soluble silicate is prepared. This sol will gel to a structure with 4.8% by weight of small particles and 95.2% by weight of large particles. However, microspheroids are not formed and the structure is not converted to the macroporous structure of the present invention.

SUMMARY OF THE INVENTION

According to this invention, there is provided, as an article of manufacture, a powder comprising a plurality of discrete, macroporous, microspheroids, each microspheroid having an average diameter in the range of about 2 to about 50 microns and comprising a plurality of contiguous large colloidal particles joined and cemented together at their points of contact by from about 1 to about 10% by weight of non-porous, amorphous silica based on the total weight of the microspheroid, to form a porous matrix, the pores of the microspheroids being uniformly distributed throughout said microspheroids, each of the large colloidal particles having an average diameter in the range of about 0.1 to about 1.0 micron and each having a surface of silica and a core of materials selected from the group consisting of silica and acid-insoluble refractory metal oxides, the microspheroids having a high degree of mechanical stability and a surface area between about 80 and about 110% of the total surface area of the large colloidal particles in the microspheroids.

In the preferred embodiment, the powder is composed of uniform sized microspheroids, i.e., a powder in which at least about 80% by weight of the microspheroids in the powder have an average diameter in the range of about 50 to about 150% of the average diameter of the microspheroids in the powder. Furthermore, in the preferred embodiment, each microspheroid in the powder has a uniform pore distribution, i.e., at least about 80% of the porosity of the microspheroids comprises pores having a diameter in the range of about 25 to about 150% of the average pore diameter of the microspheroids, and less than about 2% of the pores in the microspheroid have an average diameter of less than about 0.01 micron.

Also provided is a process for producing a powder of discrete, macroporous, microspheroids comprising steps of:

(a) forming a powder of microspheroids, each having an average diameter in the range of about 2 to about 50 microns, each microspheroid being a coherent aggregate of:

(1) a plurality of large colloidal particles having an average diameter in the range of about 0.1 to about 1.0 micron and each having a surface of silica and a core of material selected from the group consisting of silica and acid-insoluble refractory metal oxides, and (2) a plurality of small colloidal silica particles having an average diameter of about 1 to about 10 nanometers, the average diameter of said small colloidal particles being less than or equal to about one-tenth the average diameter of the large colloidal particles, and (b) heating the microspheroids so formed to a temperature in the range of about 650° to about 1050° C. until the small colloidal particles have sintered to each other and to the large colloidal particles forming a non-porous silica coating joining and cementing together the large colloidal particles.

In the preferred process, uniform sized microspheroids are formed by the steps of:

(a) forming an aqueous sol of large colloidal particles and small colloidal particles;

(b) forming a homogeneous solution of the sol with a polymerizable organic material comprising formaldehyde and a second organic material selected from the group consisting of urea and melamine; and (c) initiating polymerization of the organic material in the solution to cause coacervation of the organic material and the colloidal particles into microspheroids. The sol of large and small colloidal particles is usually formed by first forming separate sols of large and small particles and then mixing the two separate sols.

BRIEF DESCRIPTION OF THE DRAWINGS

The present invention can best be described by reference to the following figures in which.

DISCUSSION OF THE PREFERRED EMBODIMENT

Figure 1:
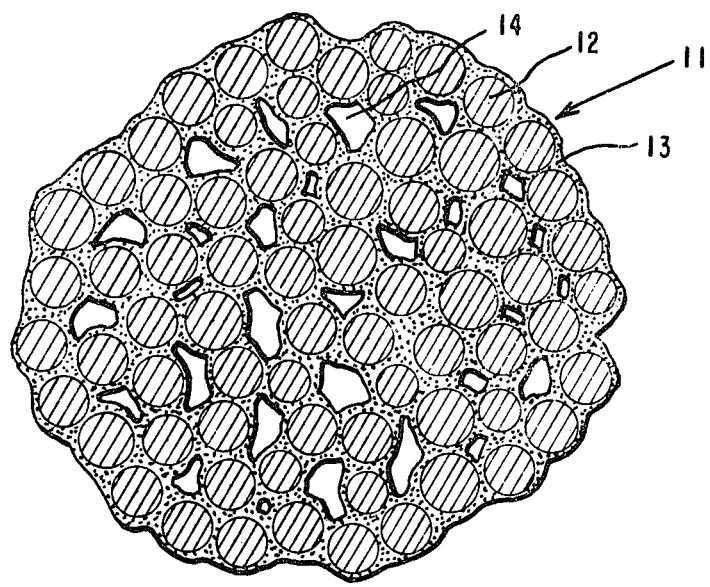
FIG. 1 is an enlarged cross-section view of one microspheroid of the present invention showing how the large colloidal particles are bonded together by the silica provided by the small colloidal particles to form the microspheroid.
Figure 2:
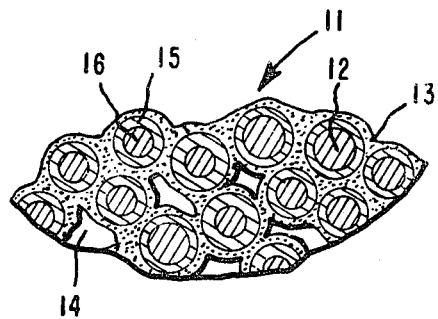
FIG. 2 is a partial cross-section view of another microspheroid of the present invention.

The present invention relates to a powder of discrete macroporous, microspheroids, such as that shown in cross-section in FIG. 1 and in partial cross-section in FIG. 2. The microspheroids 11 and small particles of a generally rounded, but not necessarily spherical, shape having an average diameter in the range of about 2 to about 50 microns, preferably between about 5 and about 20 microns. The microspheroids which make up the powder are discrete in the sense that they are separate and individual particles.

Each microspheroid is composed of a plurality of contiguous large colloidal particles 12 joined and connected together at their points of contact by a coating of about 1 to about 10% by weight of non-porous, amorphous silica 13, based on the weight of the microspheroid. The thickness of the coating and its intrusion into the pores of the microspheroid are exaggerated in the Figures for clarity. The coating is only a few particles thick, generally in the range of about 10 to about 100 Å thick. The large colloidal particles are of such size that when aggregated into microspheroids, the pores 14 between the particles have an average diameter in the range of about 0.05 to about 0.50 micron. The geometry of random packing of large colloidal particles dictates that to obtain this pore size, the large colloidal particles should have an average diameter in the range of about 0.1 to about 1.0 micron, preferably about 0.2 to about 0.5 micron. They may be composed entirely of silica, as shown in FIG. 1, or, as shown in FIG. 2, they may have a surface 15 of silica and a core 16 of a material selected from the group consisting of silica and acid-insoluble, refractory metal oxides, such as aluminum oxide, titanium dioxide, zirconium dioxide, ferric oxide, tin oxide, antimony oxide, or combinations thereof.

Since the large colloidal particles will be subjected to temperatures of up to 1050° C. during formation of the powder, the core material must be refractory, i.e., it must be stable and non-melting at temperatures up to at least 1050° C. Furthermore, the core must not contain a basic material which will react with the silica at high temperatures. Acid-insolubility, e.g., at pH 2, assures lack of basicity.

Colloidal silica particles in the size range set forth above are described in U.S. Pat. No. 3,855,172. Titanium dioxide particles in the size range of 0.2 – 0.5 micron with a silica coating are described in U.S. Pat. No. 2,855,366. Aluminum oxide particles in this size range are described in U.S. Pat. No. 3,370,017. These particles can be coated with a film of silica by the process of U.S. Pat. No. 2,855,366 or with a layer of colloidal particles as described by Iler in the *Journal of the American Ceramic Society*, 47, 196, 1964. Other refractory oxides for use as the large colloidal particles of the present invention can be made by one skilled in the art of fine grinding, and can be coated with silica as described above. In most cases, precoating with silica can be done by suspending the large colloidal particles in a dilute (2%) solution of sodium silicate having a $SiO_2$:$Na_2O$ molecular ratio of 3.25:1.0, and heating to 80°–100° C. for one hour.

The microspheroids of the present invention are macroporous, which means that they have an average pore diameter in the range of 0.05 to 0.5 micron as determined by conventional mercury penetration methods. Preferably, the microspheroids are uniformly macroporous, meaning that at least 80% of the volume of their porosity consists of pores having diameters of from about 25 to about 150% of the average pore diameter, and less than 2% by volume of the porosity consists of pores smaller than 0.01 micron. Also preferably, the microspheroids are of uniform size, meaning that 80% of the microspheroids have a diameter between about 50 and about 150% of their average diameter.

The large colloidal particles in each microspheroid are contiguous in the sense that they are joined to neighboring large colloidal particles in the microspheroidal aggregate. They are actually cemented together by a thin coating of non-porous amorphous silica. Nonporous, as used herein, means that the material does not contain pores which can be penetrated by nitrogen molecules.

The microspheroids of the present invention have a high degree of mechanical strength. By this it is meant that the particles can be handled and used without being destroyed. The degree of destruction is a subjective question, but one relatively quantitative test of mechanical stability is as follows. A 2.5 cm. agate morter and pestle is placed on one arm of a top loading balance, the balance weights are set to tare the equipment on the pan, and 300 g. additional weight is added. To the morter, a 1-2 mg. sample of powder is added and ground with a pestle using enough pressure to just displace the 300 g. weight. The pestle is moved clockwise, counterclockwise, and in a figure eight for 15 revolutions. Approximately 4-6 drops of water are then added to the morter and slurried with the sample. A drop of this slurry is then placed on a microscope slide, under a cover glass, and observed at 400X. If anything more than just a "few" fines are produced, the powder does not have a high degree of mechanical stability. Although the term "few" is still subjective, the powders of the present invention are clearly distinguished from those of the prior art by this test because the prior art powders made using large colloidal particles in the size range set forth above are almost totally destroyed by this test — unless they have been sintered to the point where they are virtual solids.

In addition to having a high degree of mechanical stability, therefore, the powders of the present invention are composed of microspheroids having a total surface area between about 80 and about 110%, preferably between about 90 and about 100%, of the total surface area of the large colloidal particle in the microspheroids. Below about 80%, the particles become too solid; above about 110%, they have a significant number of non-macroscopic pores.

The powders of the present invention can be formed by first forming a powder of microspheroids each having an average diameter in the range of about 2 to about 50 microns and each being a coherent aggregate of (1) a plurality of large colloidal particles defined to have an average diameter in the range of about 0.1 to about 1.0 micron and each having a surface of silica and a core of the materials selected from the group consisting of silica and acid-insoluble refractory metal oxides, and (2) a plurality of small colloidal silica particles defined to have an average diameter of about 1.0 to about 10.0 nanometers, the average diameter of the small colloidal particles being less than or equal to about one-tenth of the average diameter of the large colloidal particles. The small colloidal particles go to the points of contact between the large colloidal particles and impart some mechanical stability to the microspheroids until they are sintered. After the powder is formed, it is heated to a temperature in the range of about 650° to about 1050° C. until the small colloidal particles have sintered to each other and to the large colloidal particles forming a nonporous silica coating joining and cementing together the large colloidal particles.

These small colloidal particles are here defined as particles with a diameter of 1 to 10 nanometers, preferably 1 to 6 nanometers. The term colloidal has, in the past, been restricted to particles larger than about 5 nanometers, because smaller particles were difficult to distinguish and measure. Particles smaller than 5 nanometers were, therefore, normally referred to as "polysilicic acid" or "silica acid oligomers". However, by modern techniques using the electron microscope and ultra filters of known pore sizes, or by other means such as measuring the specific surface area of the particles by an alkali titration procedure, it is possible to show that when alkali is removed from or neutralized in a solution of an alkali metal or organic base silicate, very small particles, down to 1 nanometer in size, are formed. In this disclosure, instead of referring to the small particles as "oligomeric silica from 1 to 5 nanometers in diameter and colloidal silica particles from 5 to 10 nanometers in diameter" they will, for convenience, be referred to collectively as "small colloidal silica particles".

Particles of silica smaller than about 4 nanometers in diameter can be obtained by removing alkali by ion exchange from a solution silicate at 25° C. as described by Iler in a monograph on "Colloidal Silica" in *Surface and Colloidal Science*, E. Matijevic, Editor, published by John Wiley & Sons, New York, 1973, pages 12–13. Particles in the range of 4–10 nanometers are obtained by heating these sols, after adjustment with NaOH to give an $SiO_2:Na_2O$ molecular ratio of 80:1 to 100:1. Heating to 80°–100° C. for 0.5 to 6 hours is sufficient. A process for making such sols in the 5–8 nanometer size range is described by Alexander in U.S. Pat. No. 2,750,345.

Another source of small colloidal silica particles is a solution of strong organic base silicate neutralized with a volatile acid. When mixed with acid, the silicate ions are converted to various small colloidal particles, free from detrimental alkali metal sols. When the silicate solution is dried and heated in air at a temperature sufficient to burn out the organic matter, the silica remains in an extremely finely divided state of high specific surface area, and it is thus equivalent to dried small colloidal particles.

It is preferred to use silica particles smaller than about 5 nanometers in diameter, because they sinter to a nonporous amorphous silica more rapidly than larger particles up to 10 nanometers in size.

Although spheroids of large colloidal silica particles can be made with colloidal particles up to 0.5 micron in size by various means, the coherence of the particles decreases with increasing size. Using colloidal particles larger than 0.1 micron in size, the microspheroids are fragile and cannot be handled in large scale mechanical equipment without some of them breaking up, even after they have been heated to 1050° C. to improve their mutual adhesion. Thus, the product of U.S. Pat. No. 3,855,172 is quite stable when made with colloidal silica smaller than 0.1 micron in diameter, but when made with larger particles, the microspheroids are useful for some purposes, but not for others. In the present invention, the intermediate powder is given limited stability by the presence of the small colloidal particles at the points of contact of the larger colloidal particles. These small colloidal particles hold the large colloidal particles in their aggregated state. Upon sintering, the small colloidal particles are converted to the non-porous, amorphous, silica coating which gives permanent strength to the microspheroids of the powder.

There are several known ways for forming the microspheroid powders which are to be sintered. The coacervation process described in U.S. Pat. No. 3,855,172 may be used. As the first step in this process, an aqueous sol of the large colloidal and small colloidal particle is formed. This is usually accomplished by first forming an aqueous sol of the large colloidal particles and an aqueous sol of the small colloidal particles and then mixing these separate sols to form the composite particle sol. Then a homogeneous solution of this sol with a polymerizable organic material comprising formaldehyde and a second organic material selected from the group consisting of urea and melamine is formed, and polymerization of the organic material is initiated in the solution to cause coacervation of the organic material and the colloidal particles into microspheroids. One way to accomplish this is to initiate polymerization by adjusting the pH of the solution as described in U.S. Pat. No. 3,855,172. After the coacervation process, the particles are collected, dried, and then the organic material is burned off by heating the microspheroids to a temperature sufficient to burn off the organic material. Finally, the microspheroids are sintered at the temperature referred to above. Burning off the organic material and sintering of the microparticles can be accomplished at the same time, but, preferably, the heating is accomplished in two stages to prevent the formation of contaminating carbides.

The advantage of this process is that the macroporous microspheroids so formed are uniform sized.

As another method of forming the microspheroid powder, the large and small colloidal particles can be mixed in an aqueous colloidal dispersion which can then be concentrated at less than 60° C. by vacuum evaporation (so as not to cause the small particles to grow) to a concentration which can be spray-dried into microspheroids of the desired size. Microspheroids of small colloidal, but not large colloidal, particles have been formed this way in the past. To delay cohesion of component particles until a concentrated droplet is formed, it is generally preferable to have such a mixture deionized and at pH less than 5; or to adjust the pH to 2–3 with a volatile acid such as nitric acid, or to a pH of 8–10 with a volatile base such as ammonia. Otherwise, under some circumstances, the microspheroids formed may be hollow and not desirable for some uses.

Preferably, the concentrated sol referred to above can be adjusted with a volatile acid or base to a pH of about 5 to about 6 and then sprayed, at once, as a mist of droplets smaller than about 100 microns in diameter into a hot air bath or onto a hot organic fluid, such as toluene, which will cause them to solidify. Once the pH is adjusted, gelling begins so the viscosity increases. In a short time, the viscosity will be such that the solution cannot be sprayed as very fine droplets. The temperature must generally not be above 120° C., since this would cause the water to be explosively vaporized and disrupt the structure of the microspheroids. Alternatively, the concentrated sol may be emulsified in an immiscible organic fluid as droplets are heated to form solid microspheroids. These methods may give microspheroids of a mixture of sizes and it may be necessary to remove the particles larger than 50 microns for some applications (e.g., by air classification).

As a final example of how the microspheroid powders can be formed, a concentrated sol of large colloidal particles may be admixed with a soluble organic base silicate such as tetramethyl ammonium or guanidinium silicate. See for example U.S. Pat. No. 3,925,078. This sol may be sprayed-dried directly, or it may be neutralized to a pH below 6 with a volatile acid such as $HNO_3$ or acidic, to generate the small colloidal silica particles, and then sprayed-dried or heat-gelled as described above.

Other methods for converting the mixture of small and large colloidal particles to porous, microspheroids are well known to those skilled in the art of making finely divided spheroidal silica or silica-refractory metal oxide catalyst gels.

Certain non-volatile alkaline impurities, such as sodium as an oxide, lowers the sintering temperatures of small colloidal particles. In the complete absence of sodium, heating the microspheroids for several hours at 1050° C. may be required to sinter the small colloidal silica components to a non-porous amorphous silica cement. With a little sodium, the sintering time may be decreased to a few minutes. So the presence of some sodium may, in some instances, be desirable, but too much sodium can cause crystallization of silica at temperatures over 800° C. which will destroy the microspheroids of the present invention. For this reason, the sodium content in the small colloidal silica particles should not exceed 0.50% by weight, and in the overall mixture of large and small colloidal silica particles, should not exceed about 0.1% by weight, preferably 0.05%, based on the total weight of the sol in the microspheroid.

If sodium silicate were used instead of small colloidal silica particles to provide the up to 10% silica used as cement in the microspherods, the sodium content of the silica binder would be at least 2%. This is because sodium silicate solution of the lowest alkali content contains at least one part by weight $Na_2O$ to every four or five parts of $SiO_2$. This amount of alkali will cause devitrification of the binder at high temperatures. Also if the product is used as a catalyst base, the long term thermal stability and activity of the catalyst will deteriorate due to the sodium content. For example, sodium silicate may be used if, after spray-drying, the silicate is converted to microporous silica gel by acidification, and the sodium is removed from the sol prior to the time that the microspheroids are heated.

A key step in making the product of the present invention is heating the microspheroids to convert the small colloidal silica particles into non-porous amorphous silica which cements the large colloidal silica particles together. The microspheroid powder is heated to such temperatures and for such time as to cement the large colloidal silica particles together, but not so hot or for so long to collapse the microspheroids to a more dense, less porous state. To determine whether or not the heating has been sufficient, samples of a given composition can be taken after selected times and temperatures of heating, and either nitrogen absorption isotherms or mercury intrusion plots can be run to determine if micropores are present. See the discussion and reference to methods on page 144–146 of "The Colloidal Chemistry of Silica and Silicates" by R. K. Iler, Cornell Press, 1955. Alternatively, the specific surface area of a sample of the heated microspheroids may be compared with the specific surface area of a dried sample of the large colloidal silica particles used in making the microspheroid. The unheated microspheroids will have a much higher specific surface area than an equal weight of large colloidal particles, but the sintered microspheroids should have a surface area almost equivalent to that of an equal weight of the large colloidal particles.

For example, a composition of 95% large colloidal particles with a diameter of 0.3 micron and a specific surface area of $10m^2/g$, and 5% of small colloidal silica particles with a diameter of 4 nm. and an area of $700m^2/g$ will have an overall specific area of $44.5m^2/g$. After this has been heated until the small colloidal particles have sintered to form the non-porous binder, the specific surface area will be $9.5m^2/g$. Thus, when the specific surface area of the heated sample drops below about $10m^2/g$, very few, if any, micropores remain in the product. But if the area drops, for example, to 7 or 8 $m^2/g$, it is evident that the desired structure of the microspheroids is also deteriorating by sintering and this should be avoided unless smaller pores are desired.

The microspheroids of the present invention may be used as silica catalysts or as bases for other catalytic materials. Thus, platinum or nickel or transition metal oxides may be deposited on the inner and outer surfaces of the microspheroids. The total surface may be coated with colloidal alumina silicates of particle sizes smaller than about 0.002 micron, which can easily enter the pores, or the surface may be converted to an alumina silicate catalyst by treatment with sodium aluminate solution and washing with ammonium salt.

Some or all of the large colloidal silica particles in the microspheroid may have cores, consisting of a refractory oxide such as titanium dioxide. Microspheroids of this type, smaller than 10 microns in diameter, are useful as pigments. Alternatively, the cores may consist of colored oxides such as manganese, chromium, iron, and the like.

Powders of the microspheroids described above are especially useful as packing materials for the resolving zone of a liquid chromatograph. Liquid chromatography is a powerful technique used to separate various constituents in a sample. This separation is caused by the differing interaction between the constituents of that sample and the material of the resolving zone. In at least one form of liquid chromatography, size exclusion, that material comprises a plurality of essentially inert, porous microspheroids which are packed into a resolving zone usually in the shape of a long narrow column. As the sample is eluted through the resolving zone by a carrier liquid, the various molecules of the sample constituents diffuse into and out of the pores of the microspheroids. The time during which this occurs differs for molecules of different size, and hence the retention time of the resolving zone for the various constituents of a sample varies.

The trend in modern liquid chromatography is to design packing materials for the resolving zone which are particularly useful in separating particular sample constituents. In particular, a substrate with a plurality of very small pores will be effective in separating small molecular weight fractions from those molecular weight fractions which are too large to penetrate into the pores in the substrate. In particular, one can design a whole series of chromatographic packing with varying pore size which will be optimal for retaining and separating various molecular weight fractions of a sample.

Figure 5:
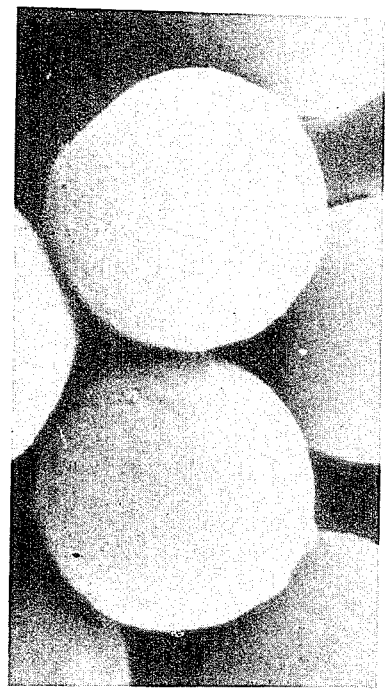
FIG. 5 is a photomicrograph of a prior art microspheroid composed of smaller colloidal particles.

FIG. 5 is a molecular weight calibration curve for six different column packings spanning a molecular weight range from $10^2$ to $10^7$ as a function of the distribution coefficient K. This coefficient, which is well known in the theory of chromatographic separation, is defined as $$K = (V_r - V_o)/(V_t - V_o),$$

where $V_r$ is the retention volume of the carrier liquid, $V_o$ is the retention of volume of a species of molecule which will be totally excluded from the microspheroid, and $V_t$ is the retention volume of a totally permeating species such as toluene.

Figure 3:
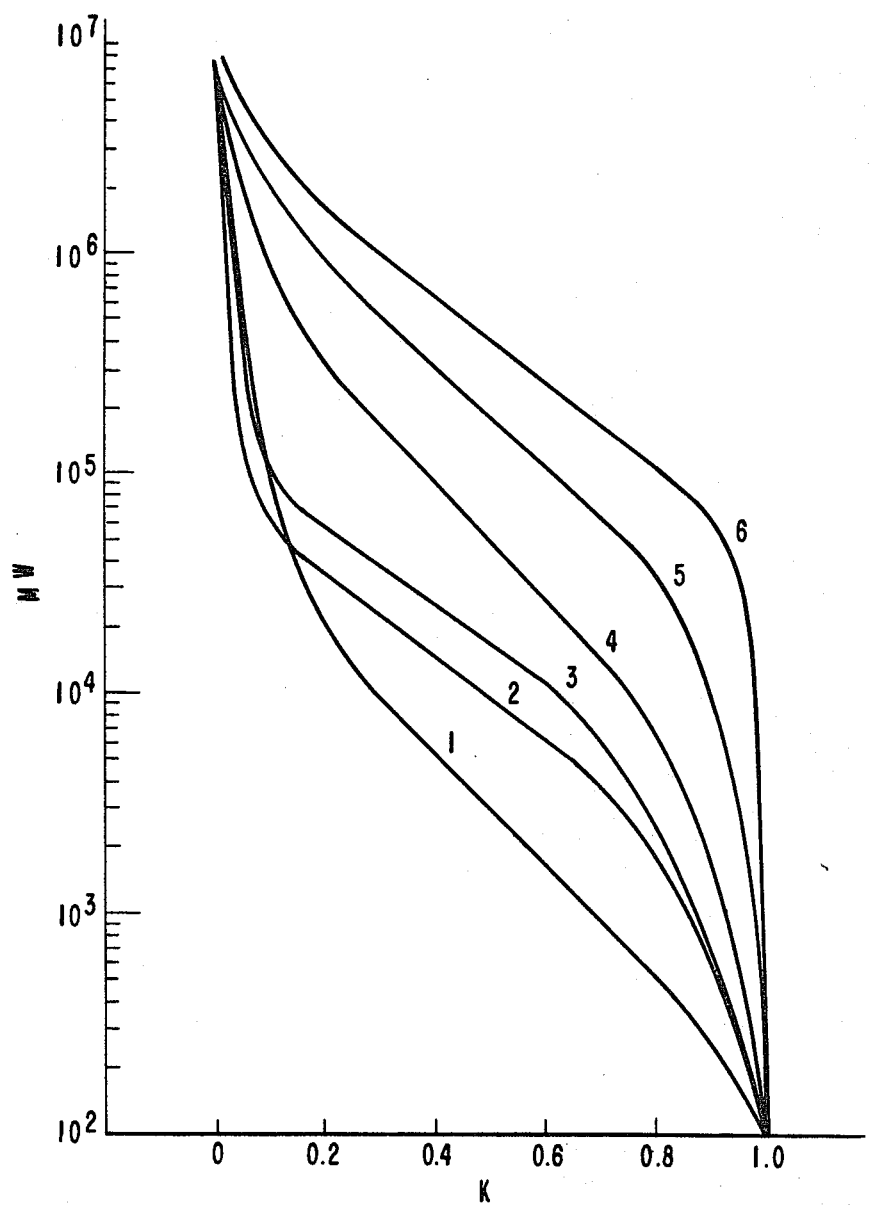
FIG. 3 is a plot of a molecular weight calibration curve as a function of distribution coefficient for chromatographic packing materials made from six different powders of microspheroids, including microspheroids of the present invention and prior art microspheroids.
Figure 4:
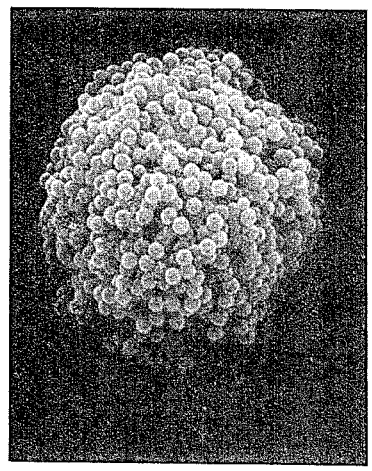
FIG. 4 is a photomicrograph of the microspheroid shown in cross-section in FIG. 1, showing the large colloidal particles which make up the microspheroid.

The characteristics of the microspheroids used in the resolving zone of the chromatographs used to produce FIG. 5 are set forth in Table I. There are six different types of particles, each with an average diameter of between about 6 and 9 microns. The internal porosity of these particles, as measured by mercury intrusion methods, ranges between 0.4 and 0.5 cc/g, and the porosity volume, again measured by mercury intrusion methods, ranges between 42 and 53%. The particles, therefore, are very similar, except that their average pore diameter ranges between 60 and 3500 Å, and, as the pore diameter increases, the surface area of the particles decreases from about 270 to about 9 mg²/g. Since, for random close packing, the pore size is equivalent to about one-half of the diameter of the colloidal particles forming the structure, only the last of these microspheroids, number 6, falls within the scope of the present invention. The curves of FIG. 3 are, therefore, characterized (1 to 6) by increasing pore size as shown in Table I. A photomicrograph of that structure is shown in FIG. 4. A photomicrograph of a prior art microspheroid, number 1, is shown in FIG. 5.

TABLE I

| | Microspheroid Characteristics | | | | |
|---|---|---|---|---|---|
| No. | Average Diameter μ | Average Pore Size (A) | Surface Area (m²/g) | Porosity (cc/g) | Porosity Volume (%) |
| 1 | 5.9 ± 3.1 | 60 | 271 | 0.389 | 47.2 |
| 2 | 8.9 ± 2.2 | 125 | 84 | 0.384 | 45.8 |
| 3 | 7.7 ± 1.9 | 195 | 52 | 0.325 | 41.7 |
| 4 | 6.0 ± 1.5 | 300 | 32 | 0.426 | 48.3 |
| 5 | 8.9 ± 1.2 | 750 | 20 | 0.459 | 50.2 |
| 6 | 6 | 3500 | 8.9 | 0.512 | 53.0 |

A series of columns packed with these particles was made. The column tubes used in the work described hereinafter had especially selected, highly polished inside walls, and an internal diameter of 0.78 cm. All but numbers 2 and 6 had a length of 10 cm. Numbers 2 and 6 had a length of 15 cm. The columns were prepared by the high-pressure filtration ("slurry") method, using the equipment and techniques described by J. J. Kirkland in "Chromatographia", 8, 661, 1975. Particles were suspended in a 1:1 methanol/chloroform suspension. The mobile phase (carrier liquid) used in the analysis was tetrahydrofuran, at 24° C., a pressure of 200 psi, and a flow rate of 2.2 ml/min. The calibrating samples were polystyrene standards with molecular weights ranging from $10^2$ to $10^7$.

The data in FIG. 5 shows the expected log dependence of the molecular weight fractions of the polystyrene standard as a function of K. The plots display linear portions, essentially parallel for all pore size volumes, but shifting upward along the log molecular weight axis as the pore size increases. The columns characterized by this plot permit analysis of soluents throughout a molecular range which exceeds that of most commercially available packing. For example, column 1 (60 Å) will fractionate soluents with a molecular weight of about 100. At the other extreme, polymers of molecular weight rated in $7 \times 10^6$ molecular weight are not yet totally excluded from column 6 (3500 Å). The microspheroids of the present invention, therefore, allow the chromatographic separation and subsequent characterization of molecular weight fractions of higher and higher molecular weights.

Figure 6:
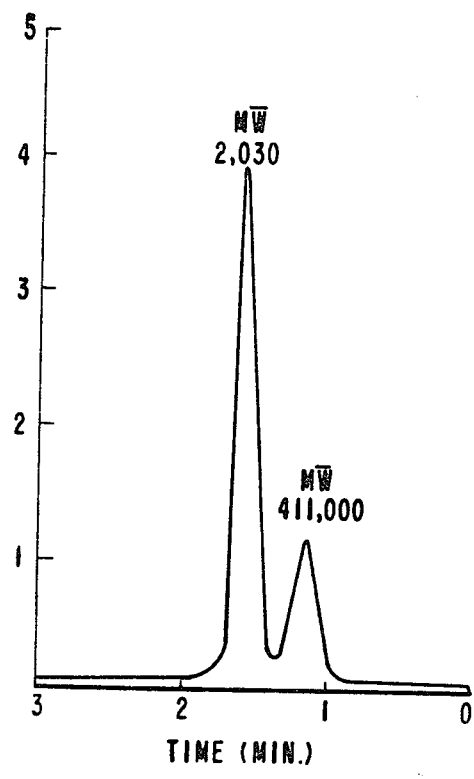
FIG. 6 is a chromatogram obtained using a powder of the present invention as a packing material.

FIG. 6 is a chromatogram showing the abilities of the number 6 packing material shown in Table I to separate the large and small molecular weight fractions of the polystyrene standard. The column used was 10 cm. long and 0.78 cm. in diameter. The mobile phase was tetrahydrofuran, at 24° C., a pressure of 200 psi, and a flow rate of 2.2 ml/min.

The above disclosure is intended to instruct those skilled in the art, and is not intended to limit the scope of the invention. Any modification, well within the skill of the art, are intended to be included within the scope of this invention and set forth in the appended claims.

What is claimed is:

1. A process of producing a powder of discrete, macroporous, microspheroids comprising the steps of:
 (a) forming a powder of microspheroids, each having an average diameter in the range of about 2 to about 50 microns, each microspheroid being a coherent aggregate of:
   (1) a plurality of large colloidal particles having an average diameter in the range of about 0.1 to about 1.0 micron and each having a surface of silica and a core of material selected from the group consisting of silica and acid-insoluble refractory metal oxides, and (2) a plurality of small colloidal silica particles having an average diameter of about 1.0 to about 10.0 nanometers, the average diameter of said small colloidal particles being less than or equal to about one-tenth the average diameter of said large colloidal particles, and (b) heating the microspheroids so formed to a temperature in the range of about 650° to about 1050° C. until the small colloidal particles have sintered to each other and to the large colloidal particles forming a nonporous silica coating joining and cementing together the large colloidal particles.

2. The process of claim 1 wherein the step of forming the powder comprises the steps of:
(a) forming an aqueous sol of said large colloidal particles and said small colloidal particles;
(b) forming a homogeneous solution of said sol with a polymerizable organic material comprising formaldehyde and a second organic material selected from the group consisting of urea and melamine; and
(c) initiating polymerization of the organic material in said solution to cause coacervation of said organic material and said colloidal particles into microspheroids.

3. The process of claim 2 wherein prior to the step of heating said microspheroids to a temperature between about 650° and 1050° C., the microspheroids are heated to a temperature sufficient to burn off said organic material.

4. The process of claim 1 wherein the step of forming the powder comprises the steps of:
(a) forming a homogeneous aqueous solution of said large colloidal particles and said small colloidal particles, and
(b) spray-drying said solution into microspheroids having an average diameter in the range of about 2 to about 50 microns.

* * * * *